Figure 1:
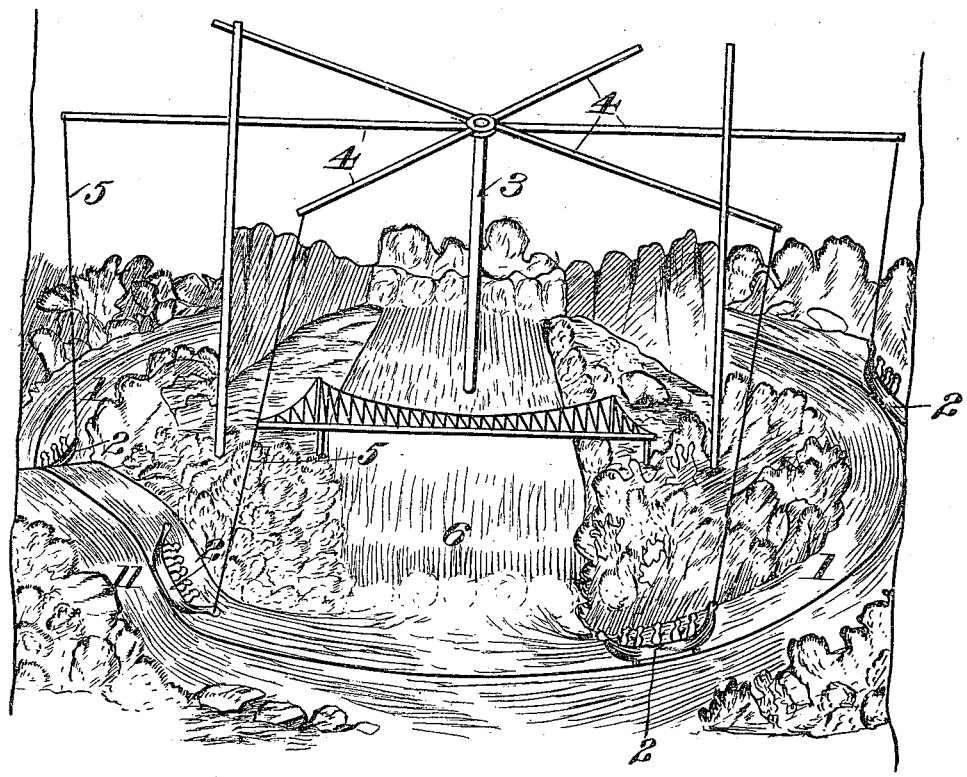

H. HEALY.
AQUATIC MERRY-GO-ROUND.
APPLICATION FILED FEB. 24, 1908.

953,266.

Patented Mar. 29, 1910.

2 SHEETS—SHEET 1.

Witnesses
C. H. Walker.
E. S. Dalton.

Inventor
Henry Healy
By
Attorney

H. HEALY.
AQUATIC MERRY-GO-ROUND.
APPLICATION FILED FEB. 24, 1908.
953,266.
Patented Mar. 29, 1910.
2 SHEETS—SHEET 2.
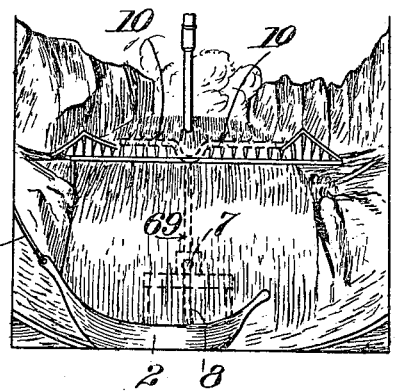
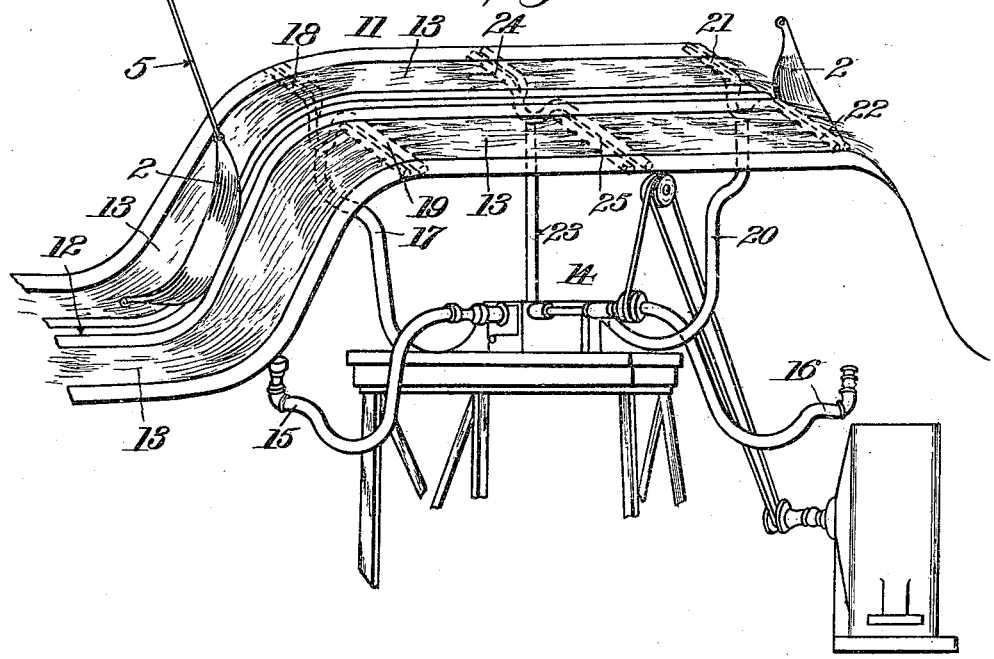
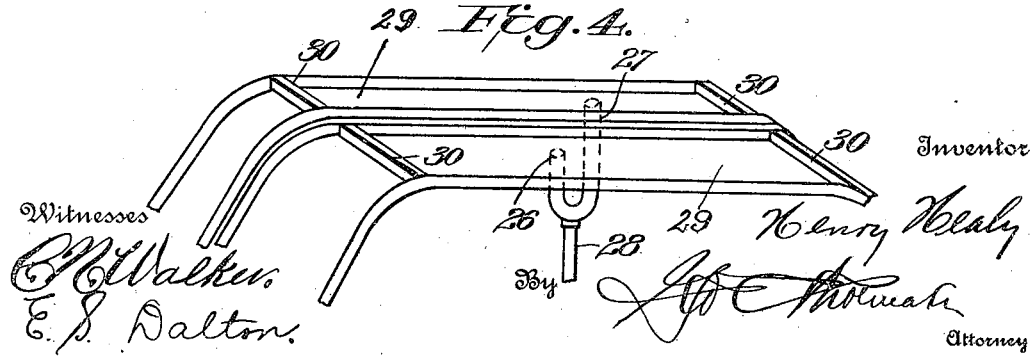

UNITED STATES PATENT OFFICE.

HENRY HEALY, OF BUFFALO, NEW YORK.

AQUATIC MERRY-GO-ROUND.

953,266.

Specification of Letters Patent. Patented Mar. 29, 1910.

Application filed February 24, 1908. Serial No. 417,490.

*To all whom it may concern:*

Be it known that I, HENRY HEALY, citizen of the United States, residing at Buffalo, in the county of Erie and State of New York, have invented certain new and useful Improvements in Aquatic Merry-Go-Rounds; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

My invention consists of certain features or adjuncts to be employed in connection with an aquatic merry-go-round for which Letters Patent Number 862,157 were granted to me on the 6th day of August, 1907. The invention covered by such Letters Patent, as broadly outlined, consists of a waterway, preferably circular or endless, a series of boats for travel in such waterway, a guide-rail or rails in such waterway, either above the surface of the water or on the bottom of the waterway, for causing the boats to travel in a fixed path, suitable power for propelling the boats in a direction parallel to the guide-rail or rails and necessary features for accurately producing the natural scenery of the locality sought to be represented.

The features or adjuncts which I propose to add to and combine with the above outlined construction and which constitute my present invention are, first, a fall of running water incorporated into the scenery and fed or produced by the water from the stream in which the boats travel, the water finally emptying back into the stream, and secondly, a double fall of water incorporated into the line of travel of the boats and up, over and down which such boats are caused to travel, the double falls being fed or produced by the water from the stream in which the boats travel, the water finally emptying back into the stream.

I will now minutely describe the manner in which I have carried out my invention and then claim what I believe to be novel.

In the drawings, Figure 1 is a view representing in perspective the application of my improvements to an aquatic merry-go-round. Fig. 2 is an enlarged detail showing the fall of water incorporated into the scenery. Fig. 3 is a similar view showing the fall of water in the line of travel of the boat and Fig. 4 illustrates a modification of Fig. 3.

Referring to the drawings, 1 is the waterway around which the boats 2 are to be propelled, the means shown in Fig. 1 being a central vertical revolving shaft 3, with radial arms 4 provided at their outer ends with flexible connections 5 attached to boats 2.

In Fig. 1 is shown in a general way the straight sheet of falling water 6 incorporated into the scenery and in Fig. 2 I have shown specifically the manner of supplying the water which forms the fall. In such figure 7 is a pump which draws its supply, through pipe 8, from the waterway. This water is forced up, through pipe 9 into the branch perforated pipes 10, 10, from which it is discharged to form the straight sheet of falling water, as shown. This water drains back into the waterway 1.

In Fig. 1 I have shown, in a general way, the falls 11 incorporated into the line of travel of the boats and in Fig. 3 I have shown specifically the manner of supplying the water which forms the fall. In such figure, 12 is an intermediate space along which the boat 2 rides up, over and down such falls in its travel. On either side of space 12 are the channels 13, 13, into which the water is pumped to produce the falls. Still referring to Fig. 3, 14 is the double pump, which draws water from the lower level or waterway 1, through the suction-pipes 15, 16. The water from pipe 15 is forced up through the pipe 17 into the double branch perforated pipes 18 and 19, from which the water is discharged to form the falls on one side. The water from pipe 16 is forced up through the pipe 20 into the double branch perforated pipes 21 and 22, from which the water is discharged to form the falls on the opposite side. Water is forced through the pipe 23 to the double branch perforated pipes 24 and 25, centrally arranged across the upper level or top of the falls and the water discharged therefrom in opposite directions flows to and over the brinks of both sides of the falls.

In Fig. 4 I have shown a modification of the construction in Fig. 3, just described. Instead of the different systems of perforated pipes I have formed the two elongated basins or troughs 29, 29, which are supplied with water from the separate pipes 26 and 27, through the common supply-pipe 28. The water from the pipes 26 and 27 fills the two basins or troughs 29, 29, and the water overflowing the end walls 30 produces the falls on each side.

When one of the boats reaches the falls, just described it is carried, with its load of passengers, up one side, across the top or upper level and down the opposite side in an exciting and realistic manner.

My improved system of drawing the water, for producing the falls, from the waterway or lower level and permitting it to drain back into such waterway obviates the necessity of a constant and expensive supply of water for producing the effect of the falls as herein outlined.

I claim.

1. In an amusement device, a waterway, guiding means in the waterway, a boat for travel in the waterway, means detachably connecting the boat to the guiding means, a straight sheet of falling water incorporated into the scenery surrounding the waterway and means for feeding the water producing the fall from the stream in which the boat travels, such water finally emptying back into said stream.

2. In an amusement device, a waterway, guiding means in the waterway, a boat for travel in the waterway, means detachably connecting the boat to the guiding means, a double fall of water incorporated into the line of travel of the boat and up, over and down which such boat is caused to travel and means for feeding the water producing the double fall, from the stream in which the boat travels, such water finally emptying back into said stream.

In testimony whereof, I have signed my name to this specification, in the presence of two subscribing witnesses.

HENRY HEALY.

Witnesses:
M. M. MAHONY,
THOMAS R. STONE.